United States Patent
Ghiang et al.

(10) Patent No.: US 7,297,192 B2
(45) Date of Patent: Nov. 20, 2007

(54) FLAME RETARDANT AND FLAME-RETARDANT RESIN COMPOSITION CONTAINING THE SAME AND ITS USE

(75) Inventors: Shun-Jen Ghiang, Kaohsiung (TW); Shih-Feng Huang, Kaohsiung (TW); Kwang-Ming Lee, Kaohsiung (TW)

(73) Assignee: Eternal Chemical Co., Ltd., Taiwan (CN)

( * ) Notice: Subject to any disclaimer, the term of this patent is extended or adjusted under 35 U.S.C. 154(b) by 0 days.

(21) Appl. No.: 11/434,315

(22) Filed: May 15, 2006

(65) Prior Publication Data
US 2006/0254458 A1    Nov. 16, 2006

(30) Foreign Application Priority Data
May 16, 2005    (TW) .............................. 94115823 A

(51) Int. Cl.
| | |
|---|---|
| *C09K 21/10* | (2006.01) |
| *C09K 21/00* | (2006.01) |
| *C08G 59/00* | (2006.01) |
| *C08G 59/62* | (2006.01) |
| *C08K 3/00* | (2006.01) |
| *C08K 3/18* | (2006.01) |
| *C08K 5/00* | (2006.01) |
| *C08K 5/34* | (2006.01) |
| *C08L 61/00* | (2006.01) |

(52) U.S. Cl. .............................. 106/18.21; 106/18.12; 106/18.13; 106/18.14; 106/18.18; 252/601; 252/609; 428/920; 428/921; 524/86; 524/100; 361/1; 438/106

(58) Field of Classification Search .............. 106/18.21, 106/18.12, 18.13, 18.14, 18.18; 252/601; 252/609; 361/1; 428/920, 921; 438/106; 524/86, 100
See application file for complete search history.

(56) References Cited

U.S. PATENT DOCUMENTS

| | | | | |
|---|---|---|---|---|
| 6,291,627 | B1 * | 9/2001 | Wang et al. ................... | 528/99 |
| 6,613,848 | B1 * | 9/2003 | Wang et al. ................. | 525/481 |
| 6,992,151 | B2 * | 1/2006 | Wang et al. ................. | 525/480 |

* cited by examiner

*Primary Examiner*—Anthony J. Green
(74) *Attorney, Agent, or Firm*—Ladas & Parry LLP

(57) ABSTRACT

The invention relates to a flame retardant, comprising (A) a triazine-phenolic resin, (B) a nitrogen-containing compound, and (C) at least one metal compound, wherein said triazine-phenolic resin has formula (I):

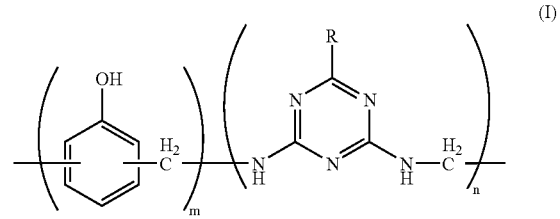

wherein, m and n are independently an integer ranging from 1 to 10 and R is $OH$, $NH_2$, $COOH$, $SO_3H$, $C(O)H$, or $CH_3CONH$.

The invention further relates to flame-retardant resin composition containing the above flame retardant and its use.

20 Claims, No Drawings

FLAME RETARDANT AND FLAME-RETARDANT RESIN COMPOSITION CONTAINING THE SAME AND ITS USE

BACKGROUND OF THE INVENTION

1. Field of the Invention

The subject invention relates to a flame retardant and a flame-retardant resin composition containing the flame retardant and its use.

2. Description of the Prior Art

Around us, there are many articles with a close connection to daily life which are made from flammable organic polymer materials, such as household electrical appliances, automated office equipment, electrical and electronic devices, building materials, automobile materials, etc. In order to improve quality of life and ensure safety, a way must be found to modify the properties of organic polymer materials, decrease the possibility of burning and thus decrease the frequency of fires by means of a flame retardant and flame retardant technology.

In general, organic polymer materials have poor flame retardancy. Therefore, the flame retardation of materials is the key to developing this technology, and the development and application of flame retardants are among the most crucial goals. There are various kinds of flame-retardants used in polymer materials. Depending on the presence or absence of halogen, flame retardants can be divided into two classes, i.e. halogen-containing flame retardants and halogen free flame retardants. Currently used halogen-containing flame retardants are mainly chlorine- and bromine-containing compounds. Halogen-containing flame retardants have considerable effect on flame retardancy, for example, brominated bisphenol-A epoxy resin, which can provide the effect of flame retardancy for the polymer materials when only added in a small amount. However, halogen-containing flame retardants can produce corrosive and toxic hydrogen halide gas, produce a large amount of fumes, and may be suspected of producing harmful cancer-inducing toxic gases, such as halogenated dioxin, halogenated furan, etc., when burnt. As a result, Restriction of Hazardous Substances (RoHS) in EEE has been regulated in the Directive on "Waste Electrical, Electronic Equipment (WEEE)" established by EU, wherein bromine containing compounds such as polybrominated biphenyl (PBB), polybrominated diphenyl ethers (PBDE), etc., have been clearly prohibited.

An environmentally-sensitive material free of halogen is defined as a material in which the chlorine content of the material as a whole is less than 900 ppm and the bromine content is less than 900 ppm which can be developed and used in an environmentally sensitive manner. At present, the material free of halogen is developed mainly according to the four concepts below: (1) the flame retardancy has to meet the requirement of the UL94-V0 standard; (2) the material is free of halogen; (3) the material is free of element stibium; and (4) the material is free of red phosphorus. Although stibium and red phosphorus are good substitutes for halogen as the flame retardant of epoxy resins, stibium has a risk of inducing cancer. In addition, flame retardants containing phosphorus groups have been disclosed presently in certain patents, such as U.S. Pat. No. 6,291,627 and Taiwan Patent Publication No. 490474, etc. However, although halogen-containing flame retardants can be effectively replaced by phosphorus flame retardants, the latter may result in eutrophicated rivers due to the hydrolyzation of phosphorus, which turns out to be another environmental problem. On the other hand, red phosphorus has the property of self-ignition and can easily cause danger. Therefore, stibium and red phosphorus have also become the chemicals to be avoided. To this end, the subject inventors provide a novel flame retardant, which can effectively avoid the problems described above.

SUMMARY OF THE INVENTION

The subject invention provides a flame retardant comprising (A) a triazine-phenolic resin, (B) a nitrogen-containing compound and (C) at least one metal compound. The subject invention further provides a flame-retardant resin composition containing the flame retardant, an epoxy resin, a curing agent, and an inorganic filler.

DETAILED DESCRIPTION

The triazine-phenolic resin comprised in the flame retardant of the invention has the structure of formula (I) below:

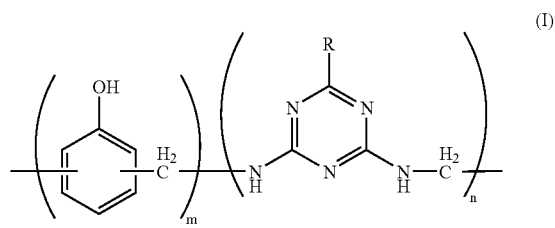

wherein, m and n are independently an integer ranging from 1 to 10, and R is OH, $NH_2$, COOH, $SO_3H$, C(O)H, or $CH_3CONH$.

According to one embodiment of the invention, the triazine-phenolic resin is of the structure of formula (I) where R is $NH_2$ and m and n are independently an integer ranging from 1 to 5, i.e. the structure of formula ($I_1$) below:

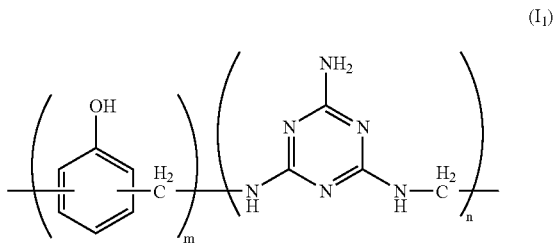

According to the embodiment of the invention, in the flame retardant of the invention, the triazine-phenolic resin content is 0.1 to 60 percent by weight, preferably 20 to 50 percent by weight, based on the total weight of the flame retardant. Furthermore, the melt viscosity of the triazine-phenolic resin at 175° C. is less than 2000 cps; and wherein the nitrogen content is 15 to 24 percent by weight, based on the total weight of the triazine-phenolic resin.

The nitrogen-containing compound used in this invention is not particularly limited, and is preferably melamine or melamine cyanurate. The amount of the nitrogen-containing compound used is 0.1 to 40 percent by weight, preferably 5 to 30 percent by weight, based on the total weight of the flame retardant.

The flame retardant of the invention comprises (C) at least one metal compound, and the amount of the metal compound is 0.1 to 70 percent by weight, preferably 10 to 60 percent by weight, based on the total weight of the flame retardant. The metal compound useful for this invention may be selected from zinc borate, zinc molybdate, a metal hydroxide, a composite metal hydroxide or mixtures thereof. In general, the preferred metal hydroxide is aluminum hydroxide or magnesium hydroxide. The composite metal hydroxide has the formula $M^a_x M^b_{1-x}(OH)_2$, wherein $M^a$ is selected from the group consisting of magnesium, calcium, tin and titanium, and the preferred $M^a$ is magnesium; $M^b$ is selected from the group consisting of manganese, iron, cobalt, nickel, copper and zinc, and the preferred $M^b$ is nickel or zinc; and X is a value satisfying the in equation $0.01 < X \leq 0.5$.

The subject invention further provides a flame-retardant resin composition containing the above flame retardant, an epoxy resin, a curing agent, and an inorganic filler.

In general, the thickness of moldings will influence the flame retardancy. Therefore, sometimes grade V-0 flame retardancy can be still achieved when testing a test specimen with a thickness of 3.2 mm without utilizing a flame retardant, while it is difficult to obtain grade V-1 flame retardancy when testing a test specimen with a thickness of 1.0 mm. It is found that grade V-0 flame retardancy can be achieved for a test specimen with a thickness of 1.0 mm by adding a triazine-phenolic resin and a nitrogen-containing compound, even if only in small amounts. To impart thin moldings with high flame retardancy is difficult to accomplish with other flame-retardants. However, the addition of a triazine-phenolic resin and a nitrogen-containing compound to a molding will lead to poor flowability. Thus at least one metal compound is added as a flame retardant additive and can increase the flowability due to a synergistic effect achieved by the additives.

The flame retardant content in the resin composition of the invention is between 0.1 and 15 percent by weight, preferably between 3 and 12 percent by weight, based on the total weight of the resin composition. If the flame retardant content is less than 0.1 percent by weight, the flame retardancy cannot be improved; if the flame retardant content is more than 15 percent by weight, curability, heat resistance and strength will be decreased, and the moisture absorption rate will be increased.

The epoxy resins that can be used in the invention are the epoxy resins with two or more functional groups, including, but not limited to, bisphenol epoxy resin, bisphenol-A epoxy resin, bisphenol-F epoxy resin, bisphenol-S epoxy resin, novolac type phenolic epoxy resin, novolac type alkyl phenolic epoxy resin, modified phenolic epoxy resin, bicyclopentadiene epoxy resin, or mixtures thereof.

According to the invention, these epoxy resins can be used alone or in the form of a mixture of two or more thereof. The epoxy resin is used in an amount of 2 to 15 percent by weight, preferably 3 to 12 percent by weight, based on the total weight of the composition.

Suitable species of the curing agent used in the resin composition of the invention will vary according to the epoxy resin used, and are well known to persons having ordinary skill in the art. Examples include, but are not limited to, a phenolic resin. Suitable phenolic resins that can be used in the invention contain two or more functional groups, which include, but not limited to, novolac resin, cresol novolac resin, triphenolalkylphenol, aralkyl resin, naphthalene type phenolic resin, cyclopentadiene type phenolic resin, or mixtures thereof.

In this invention, the amount of the curing agent used is between 2 and 10 percent by weight, preferably between 3 and 6 percent by weight, based on the total weight of the resin composition.

The inorganic fillers that can be used in the resin composition of the invention include, but are not limited to, fused silica, crystalline silica, talc, alumina, silicon nitride, or mixtures thereof, of which fused silica is preferred. In view of the balance between moldability and solder resistance, the inorganic filler is added in an amount of 70 to 95 percent by weight, based on the total weight of the composition. If the inorganic filler content is less than 70 percent by weight, the solder resistance of the resin composition will be decreased due to the increase in the moisture absorption; if the inorganic filler content is more than 95 percent by weight, the flowability of the resin composition during molding will be decreased, which will lead to a failure in filling.

Furthermore, according to the invention, a curing accelerator can be optionally used so as to accelerate the curing reaction between the epoxy group of the epoxy resin and the phenolic hydroxyl group of the curing agent. The curing accelerators that can be used in the invention include, but are not limited to, tertiary amines, organophosphine compounds, and imidazole compounds, and mixtures thereof. Examples of tertiary amines include, but are not limited to, triethylamine, dimethylaniline, benzyldimethylamine, and N,N-dimethyl-aminomethylphenol. Examples of organophosphine compounds include, but are not limited to, triphenylphosphine, trimethylphosphine, tri(p-methylphenyl)phosphine, triphenylphosphine triphenylborate and tetraphenylphosphonium tetraphenylborate. Examples of imidazole compounds include, but are not limited to, 2-methylimidazole, 2-methyl-4-methylimidazole, 2-heptadecylimidazole, and 1-cyanoethyl-4-methylimidazole. Organophosphine compounds are preferred, especially triphenylphosphine.

In the composition of the invention, the curing accelerator is used in an amount of 0.01 to 1 percent by weight, based on the total weight of the resin composition.

Furthermore, the resin composition of the invention may optionally include various additives well known to persons having ordinary skill in the art, such as a silane coupling agent, release agent (e.g. natural or synthetic wax) and colorant (e.g. carbon black).

The flame retardant comprised in the resin composition of the invention is free of halogen or stibium compounds, and the amount of halogen atoms and stibium atoms (derived from the catalysts and additives inevitably used in the resin preparation) of the composition is less than 0.1 percent by weight based on the total weight of the composition, and thus meet the environmental requirement.

The inventive flame-retardant resin composition is useful for packaging various electronic elements, especially semiconductor elements. The composition can be cured and molded by a molding process well known to persons having ordinary skill in the art, such as press molding, injection molding or vacuum molding, and provides an excellent flame retardant effect when used to package a semiconductor element.

The invention will be further illustrated by the following examples, but is not limited to the scope of the examples. Any modifications and variations that can be readily achieved by persons having ordinary skill are included in the disclosure of the invention.

EXAMPLE 1

Epoxy resin 1: 10.4 parts by weight
Phenolic resin 1: 3.6 parts by weight
Fused silica: 72 parts by weight
Triazine-phenolic resin: 3 parts by weight
Melamine cyanurate: 1 part by weight
Zinc borate: 8 parts by weight
Triphenylphosphine: 0.2 parts by weight
Silane: 0.9 parts by weight
Carnauba wax: 0.6 parts by weight
Carbon black: 0.3 parts by weight All of the above listed components were mixed by a mixer at room temperature. At a controlled temperature of 60-100° C., a flame-retardant resin composition was obtained by hot-melt kneading the mixture with a double-shaft agitator. The resultant flame-retardant resin composition was evaluated by the following methods and the results are listed in Table 3.

Evaluation Method

Spiral Flow:

Spiral flowability was measured by using a mold in accordance with EMMI-1-66, under the conditions of a molding temperature of 175° C., an injection molding pressure of 6.9 MPa and a curing time of 120 sec. The measured spiral flow length is expressed in cm.

Flame Retardancy:

Test specimens (127 mm×12.7 mm, with thicknesses of 1.0 mm, 2.0 mm and 3.0 mm, respectively) were molded using a low pressure screw injection molding machine at a molding temperature of 175° C., under an injection molding pressure of 6.9 MPa for a curing time of 120 sec, and then cured at 175° C. for 8 h. Subsequently, the time of $\Sigma F$, Fmax was measured according to the UL-94 vertical burn method and the flame retardancy was determined.

|   | Flame retardancy rating | Flame retardancy |
|---|---|---|
| V (Vertical Burn) | V-0 | Highest |
|  | V-1 | Lower |
|  | V-2 | Poor |

EXAMPLES 2~3 AND COMPARATIVE EXAMPLES 1~5

The resin compositions were prepared by the same method as used in Example 1, according to the formulations listed in Table 1 and the obtained resin compositions were evaluated by the same method as used in Example 1. The results are shown in Table 3.

TABLE 1

| Components of Flame-Retardant Resin Composition | Example | | | Comparative Example | | | | |
|---|---|---|---|---|---|---|---|---|
|  | 1 | 2 | 3 | 1 | 2 | 3 | 4 | 5 |
| Epoxy resin 1 | 10.4 | 10.4 | 10.4 | 10.3 | 11.8 | 10.8 | 11.2 | 8.6 |
| Phenolic resin 1 | 3.6 | 3.6 | 3.6 | 5.5 | 6.1 | 5.7 | 3.7 | 4.3 |
| Fused silica | 72 | 72 | 72 | 79 | 80 | 70 | 71 | 80 |
| Triazine-phenolic resin | 3 | 3 | 3 |  |  |  | 3 | 3 |
| Melamine cyanurate | 1 | 1 | 1 |  |  | 1.5 |  | 2 |
| Zinc borate | 8 |  |  |  |  | 10 | 9 |  |
| Aluminium hydroxide |  | 8 |  |  |  |  |  |  |
| Magnesium hydroxide |  |  | 8 |  |  |  |  |  |
| Brominated bisphenol-A epoxy resin |  |  |  | 2 |  |  |  |  |
| Antimony trioxide |  |  |  | 1 |  |  |  |  |
| Triphenyl-phosphine | 0.2 | 0.2 | 0.2 | 0.2 | 0.2 | 0.2 | 0.2 | 0.2 |
| Silane | 0.9 | 0.9 | 0.9 | 0.9 | 1 | 0.9 | 1 | 0.9 |
| Carnauba wax | 0.6 | 0.6 | 0.6 | 0.6 | 0.6 | 0.6 | 0.6 | 0.6 |
| Carbon black | 0.3 | 0.3 | 0.3 | 0.5 | 0.3 | 0.3 | 0.3 | 0.3 |

EXAMPLES 4~6 AND COMPARATIVE EXAMPLES 6~10

The resin compositions were prepared by the same method as used in example 1, except that the epoxy resin and the phenolic resin in Example 1 were replaced by those listed in Table 2, and the obtained resin compositions were evaluated by the same method as used in Example 1. The results are shown in Table 4.

TABLE 2

| Components of Flame-Retardant Resin Composition | Example | | | Comparative Example | | | | |
|---|---|---|---|---|---|---|---|---|
|  | 4 | 5 | 6 | 6 | 7 | 8 | 9 | 10 |
| Epoxy resin 1 | 3.2 | 3.2 | 3.2 | 1.9 | 4.2 | 3.7 | 3.7 | 2.9 |
| Epoxy resin 2 | 3.3 | 3.3 | 3.3 | 5 | 4.2 | 3.7 | 3.7 | 2.9 |
| Phenolic resin 2 | 2.8 | 2.8 | 2.8 | 3.1 | 3.9 | 2.9 | 2.9 | 2 |
| Fused silica | 83.5 | 83.5 | 83.5 | 85 | 86 | 82.5 | 82.5 | 86 |
| Triazine-phenolic resin | 2 | 2 | 2 |  |  |  | 2 | 3 |
| Melamine cyanurate | 1 | 1 | 1 |  |  | 2 |  | 1.5 |
| Zinc borate | 2.5 |  |  |  |  | 3.5 | 3.5 |  |
| Aluminium hydroxide |  | 2.5 |  |  |  |  |  |  |
| Magnesium hydroxide |  |  | 2.5 |  |  |  |  |  |
| Brominated bisphenol-A epoxy resin |  |  |  | 2 |  |  |  |  |
| Antimony trioxide |  |  |  | 1 |  |  |  |  |
| Triphenyl-phosphine | 0.2 | 0.2 | 0.2 | 0.2 | 0.2 | 0.2 | 0.2 | 0.2 |
| Silane | 0.8 | 0.8 | 0.8 | 0.9 | 0.8 | 0.8 | 0.8 | 0.8 |
| Polyethylene/olefin synthetic wax | 0.4 | 0.4 | 0.4 | 0.4 | 0.4 | 0.4 | 0.4 | 0.4 |
| Carbon black | 0.3 | 0.3 | 0.3 | 0.5 | 0.3 | 0.3 | 0.3 | 0.3 |

The data of each component in Table 1~2 is described as follows:

Epoxy resin 1: ESCN-195XL, softening point: 65° C., epoxy equivalent: 200 g/eq, commercially available from Sumitomo Chemical Co.

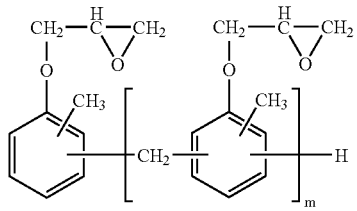

Epoxy resin 2: YX-4000H, softening point: 105° C., epoxy equivalent: 193 g/eq, commercially available from Shell.

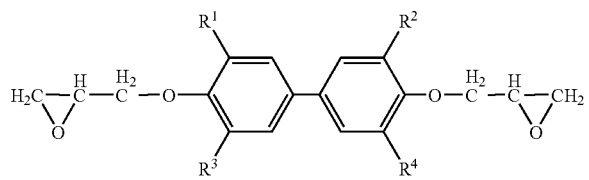

Phenolic resin 1: HRJ-1583, softening point: 84° C., OH equivalent: 103 g/eq, commercially available from Schenectady.

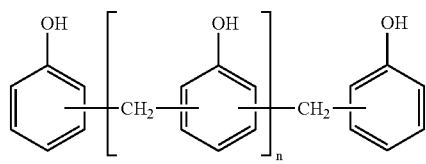

Phenolic resin 2: XLC-3L, softening point: 72° C., OH equivalent: 172 g/eq, commercially available from Mitsui Chemical, Inc.

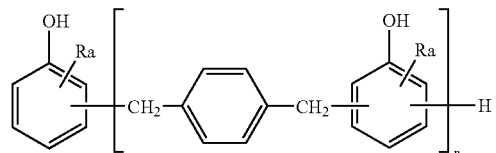

Silica: FB-74, commercially available from Electric and Chemical Company.

Triazine phenolic resin: KA-7052-L2, commercially available from DIC, Inc.

Melamine cyanurate: MC-25, commercially available from CIBA Co. Ltd.

Zinc borate: FB-415, commercially available from BORAX Inc.

Aluminum hydroxide: commercially available from SHOWA DENKO Inc.

Magnesium hydroxide: Zimi Chemicals Co. Ltd.

Brominated bisphenol-A epoxy resin: Bren-S, commercially available from Nippon Kayaku Co., Ltd.

Antimony trioxide: PATOX-MZ, commercially available from Nihon Seiko Co., Ltd.

Triphenylphosphine: TPP, commercially available from Hokkoku Co.

Polyethylene/olefin synthetic wax: PED-191, softening point: 105° C., commercially available from Clariant Co.

Silane: KBM-403, commercially available from Shin-Etsu Co.

Carnauba wax: Carnauba No. 1, commercially available from Toagosei Co., Ltd.

Carbon black: Raven 3500, commercially available from Colombian Chemicals Co.

Test Results

TABLE 3

Test results on physical properties

| Flame-Retardant Resin Composition | Example | | | Comparative Example | | | | |
|---|---|---|---|---|---|---|---|---|
|  | 1 | 2 | 3 | 1 | 2 | 3 | 4 | 5 |
| Spiral flow (cm) | 86 | 83 | 87 | 90 | 92 | 78 | 83 | 58 |
| Gel time (sec) | 30 | 29 | 31 | 30 | 30 | 21 | 31 | 21 |
| Flame retardancy 1.0 mm | V-0 | V-0 | V-0 | V-0 | Burn completely | V-2 | V-2 | V-1 |
| 2.0 mm | V-0 | V-0 | V-0 | V-0 | Burn completely | V-1 | V-1 | V-0 |
| 3.0 mm | V-0 | V-0 | V-0 | V-0 | Burn completely | V-0 | V-0 | V-0 |

TABLE 4

Test results on physical properties

| Flame-Retardant Resin Composition | Example | | | Comparative Example | | | | |
|---|---|---|---|---|---|---|---|---|
|  | 4 | 5 | 6 | 6 | 7 | 8 | 9 | 10 |
| Spiral flow (cm) | 96 | 91 | 97 | 99 | 95 | 80 | 85 | 69 |
| Gel time (sec) | 31 | 29 | 30 | 30 | 30 | 30 | 30 | 30 |

TABLE 4-continued

| | | Test results on physical properties | | | | | | | |
|---|---|---|---|---|---|---|---|---|---|
| Flame-Retardant | | Example | | | Comparative Example | | | | |
| Resin Composition | | 4 | 5 | 6 | 6 | 7 | 8 | 9 | 10 |
| Flame retardancy | 1.0 mm | V-0 | V-0 | V-0 | V-0 | Burn completely | V-2 | V-2 | V-1 |
| | 2.0 mm | V-0 | V-0 | V-0 | V-0 | Burn completely | V-1 | V-1 | V-0 |
| | 3.0 mm | V-0 | V-0 | V-0 | V-0 | Burn completely | V-0 | V-0 | V-0 |

It can be clearly seen from Tables 1 and 2 that the resin compositions according to the invention are free of halogen-based flame retardants or antimonide.

It is observed from Tables 3 and 4 that the resin compositions of Examples 1 to 6 contain the flame retardant of the invention and have good flame retardancy as evidenced by the test results. Although Comparative Examples 1 and 6 also have good flame retardancy, the flame retardants contain bromine and stibium and cannot meet the requirement of environmental protection. Comparative Examples 2 and 7 do not use a flame retardant and thus have no flame retardancy. The flame retardants used in Comparative Examples 3, 4, 8 and 9 do not contain a triazine-phenolic resin and nitrogen-containing compound simultaneously. The compositions of these examples show poor flame retardancy as evidenced by the test results. The flame retardants used in Comparative Examples 5 and 10 are lacking of a metal compound and exhibit a poor flowability as evidenced by a lower spiral flow.

Therefore, it is shown from Table 3 and 4 that the resin compositions of the invention exhibit excellent moldability; and semiconductor devices using the resin compositions of the invention will have excellent flame retardancy.

The preferred embodiments of the invention are disclosed above but are not intended to limit the invention. Any variations and modifications that can be achieved by persons having ordinary skill in the art without departing from the spirit are contemplated by the protection scope of the invention.

We claim:

1. A flame retardant, comprising (A) a triazine-phenolic resin, (B) a nitrogen-containing compound, and (C) at least one metal compound, wherein the triazine-phenolic resin has the following formula (I):

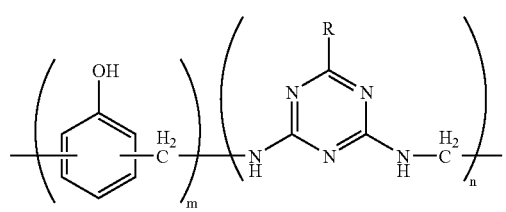

wherein, m and n are independently an integer ranging from 1 to 10 and R is OH, $NH_2$, COOH, $SO_3H$, C(O)H, or $CH_3CONH$, wherein the nitrogen-containing compound comprises melamine or melamine cyanurate, wherein the at least one metal compound is selected from the group consisting of zinc borate, zinc molybdate, a metal hydroxide, a composite metal hydroxide and mixtures thereof, and wherein the triazine-phenolic resin, the nitrogen-containing compound and the at least one metal compound are present in respective amounts effective to provide for flame retardency of the flame retardant.

2. The flame retardant according to claim 1, wherein the triazine-phenolic resin has a nitrogen content of 15 to 24 percent by weight, based on the weight of the triazine-phenolic resin.

3. The flame retardant according to claim 1, wherein the triazine-phenolic resin has the following formula ($I_1$):

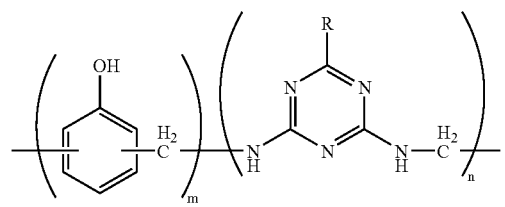

wherein, m and n are independently an integer ranging from 1 to 5.

4. The flame retardant according to claim 1, wherein the metal hydroxide is aluminum hydroxide or magnesium hydroxide.

5. The flame retardant according to claim 1, comprising the triazine-phenolic resin in an amount of 0.1 to 60 percent by weight.

6. The flame retardant according to claim 5, comprising the nitrogen-containing compound in an amount of 0.1 to 40 percent by weight.

7. The flame retardant according to claim 6, comprising the at least one metal compound in an amount of 0.1 to 70 percent by weight.

8. A flame-retardant resin composition, comprising the flame retardant according to claim 1 and an epoxy resin, a curing agent and an inorganic filler, wherein the flame retardant is present in an amount of 0.1 to 15 percent by weight, based on the total weight of the composition, wherein the epoxy resin is present in an amount of 2 to 15 percent by weight, based on the total weight of the composition, wherein the curing agent is present in an amount of 2 to 10 percent by weight, based on the total weight of the composition, and wherein the inorganic filler is present in an amount of 70 to 95 percent by weight, based on the total weight of the composition.

9. The composition according to claim 8, wherein the epoxy resin is selected from the group consisting of bisphenol epoxy resin, bisphenol-A epoxy resin, bisphenol-F epoxy resin, bisphenol-S epoxy resin, a novolac phenolic epoxy resin, a novolac alkyl phenolic epoxy resin, modified novolac epoxy resin, bicyclopentadiene epoxy resin, and mixtures thereof.

10. The composition according to claim 8, wherein the curing agent is a phenolic resin selected from the group consisting of novolac resin, cresol novolac resin, triphenolalkylphenol, aralkyl resin, a naphthalene phenolic resin, a cyclopentadiene phenolic resin, and mixtures thereof.

11. The composition according to claim 8, wherein the inorganic filler is selected from the group consisting of fused silica, crystalline silica, talc, alumina, silicon nitride, and mixtures thereof.

12. The composition according to claim 11, wherein the inorganic filler is fused silica.

13. The composition according to claim 8, further comprising 0.01 to 1 percent by weight, based on the total weight of the composition, of a curing accelerator.

14. The composition according to claim 13, wherein the curing accelerator is a tertiary amine, organophosphine compound, imidazole compound, or mixtures thereof.

15. The composition according to claim 8, wherein bromine atoms and stibium atoms are present in an amount less than 0.1 percent by weight, based on the total weight of the composition.

16. The composition according to claim 8, wherein the flame retardant comprises the at least one metal compound in an amount of 0.1 to 70 percent by weight.

17. The composition according to claim 16, wherein the flame retardant comprises the triazine-phenolic resin in an amount of 0.1 to 60 percent by weight.

18. The composition according to claim 17, wherein the flame retardant comprises the nitrogen-containing compound in an amount of 0.1 to 40 percent by weight.

19. A method for packaging an electronic element comprising: (a) providing the composition according to claim 8, and packaging the electronic element with the composition.

20. The method according to claim 19, wherein the electronic element is a semiconductor element.

* * * * *

UNITED STATES PATENT AND TRADEMARK OFFICE
CERTIFICATE OF CORRECTION

PATENT NO. : 7,297,192 B2  Page 1 of 1
APPLICATION NO. : 11/434315
DATED : November 20, 2007
INVENTOR(S) : Shun-Jen Chiang et al.

It is certified that error appears in the above-identified patent and that said Letters Patent is hereby corrected as shown below:

On title page, items 75 and 12, "Ghiang" should read -- Chiang --.

Signed and Sealed this

Eighth Day of April, 2008

JON W. DUDAS
*Director of the United States Patent and Trademark Office*